US008081966B2

(12) United States Patent
Nakazawa

(10) Patent No.: US 8,081,966 B2
(45) Date of Patent: Dec. 20, 2011

(54) RF CIRCUIT SWITCHING CIRCUIT

(75) Inventor: Sumito Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 12/129,920

(22) Filed: May 30, 2008

(65) Prior Publication Data

US 2009/0061846 A1 Mar. 5, 2009

(30) Foreign Application Priority Data

Aug. 30, 2007 (JP) ................................. 2007-223934

(51) Int. Cl.
*H04Q 7/34* (2006.01)

(52) U.S. Cl. ........... 455/423; 455/429; 385/14; 323/324

(58) Field of Classification Search .................. 455/423, 455/429; 385/14; 323/324
See application file for complete search history.

(56) References Cited

U.S. PATENT DOCUMENTS

| | | | | |
|---|---|---|---|---|
| 4,129,838 | A * | 12/1978 | Wallington et al. | 333/104 |
| 5,949,301 | A * | 9/1999 | Clarke et al. | 333/101 |
| 6,757,589 | B1 * | 6/2004 | Parker et al. | 700/282 |

FOREIGN PATENT DOCUMENTS

| | | | |
|---|---|---|---|
| EP | 0 660 436 | A1 | 6/1995 |
| GB | 1 559 974 | A | 1/1980 |
| GB | 2 301 947 | A | 12/1996 |
| JP | 60-247392 | A | 12/1985 |
| JP | 62-160826 | A | 7/1987 |
| JP | 7-336128 | A | 12/1995 |

OTHER PUBLICATIONS

European Search Report dated Dec. 12, 2008, issued in corresponding European Patent Application No. 08157242.2.
Chinese Office Action dated Jan. 26, 2011, issued in corresponding Chinese Patent Application No. 200810130290.6.

* cited by examiner

*Primary Examiner* — Phuoc Doan
(74) *Attorney, Agent, or Firm* — Westerman, Hattori, Daniels & Adrian, LLP

(57) ABSTRACT

The RF circuit switching circuit includes N/2 first RF transfer switches connected to N input wirings, N/2 second RF transfer switches connected to N output wirings and N internal connection routes including internal wirings or a combination of a plurality of third RF transfer switches and a plurality of internal wirings. The RF transfer switches on the routes are switched to connect each of the N input RF circuits to each of the N output RF circuits through the route including the first and second RF transfer switch and the internal connection route.

11 Claims, 7 Drawing Sheets

RF CIRCUIT SWITCHING CIRCUIT

CROSS-REFERENCE TO RELATED APPLICATIONS

This application claims the conventional priority based on Japanese Patent Application No. 2007-223934, filed on Jan. 25, 2007, the disclosures of which are incorporated herein by reference.

BACKGROUND OF THE INVENTION

1. Field of the Invention

An embodiment of the invention relates to an RF circuit switching circuit, which may include an RF circuit switching circuit which is used in a radio characteristic test for communication apparatus and is small, excellent in transmission characteristics and easy in maintenance and repair.

2. Description of the Related Art

In a radio characteristic test for a communication apparatus, it needs to conduct an efficient test on each of a large number of communication routes. For this reason, an RF signal circuit is sequentially switched using a radio frequency (RF) matrix switch.

A technique is known in which any one of radio frequency switches is turned on or off in a microwave communication apparatus (refer to Japanese Patent Laid-Open No. 60-247392). A technique is known in which a plurality of transfer switches is used in a circuit distributing circuit having a plurality of input and output circuits (refer to Japanese Patent Laid-Open No. 07-336128). A technique is known in which the transfer switches of a feeder circuit for selecting a plurality of element antennas are decreased in number in an array antenna (refer to Japanese Patent Laid-Open No. 62-160826).

FIGS. 6 and 7 show the structure of an RF circuit (or line) switching circuit (hereinafter, referred to as "switching circuit") as a background of the present invention. The switching circuit is used for testing a circuit (4×4 circuit) comprising four input RF circuits and four output RF circuits. FIG. 6 shows an example in which a relay switch is used, and FIG. 7 shows an example in which a circuit selector is used.

To form the switching circuit shown in FIG. 6, eight switches (hereinafter, referred to as 6-1 switch) are needed for switching between six inputs (or outputs) and one output (or input). To form the switching circuit, twenty four internal wirings are needed in total, because four wirings are needed for input, sixteen wirings for connecting between the 6-1 switches, and four wirings for output. A control circuit (not shown) controls the eight 6-1 switches. Then, connections are switched between four input RF circuits (not shown) connected to four input terminals (IN1 to IN4) and four output RF circuits (not shown) connected to four output terminals (OUT1 to OUT4).

To form the switching circuit shown in FIG. 7, twenty four 24 circuit selectors (SPDT switches) are needed. To form the switching circuit, forty internal wirings are needed in total, because four wirings are needed for input, thirty two wirings for connecting between the SPDT switches, and four wirings for output. A control circuit (not shown) controls the twenty four SPDT switches. Then, connections are switched between four input RF circuits and four output RF circuits, as is the case with FIG. 6.

According to our study, the switching circuits cause various problems, since the size of the switching circuit is so large as described above.

That is, a large number of internal wirings comprises big waveguides or big coaxial cables, so that a housing for storing the switching circuits is increased in size. A large number of measuring instruments is used in a radio characteristic test, so that a large housing makes it inconvenient to place the switching circuits. The radio characteristic test needs a better transmission characteristic. However, in the example in FIG. 7, the connections of the switches and the internal wirings are increased in number, so that transmission characteristics is degraded in the switching circuit. The number of the internal wirings in the switching circuit is large, so that it becomes difficult to perform a daily maintenance and a repair at the time of failure. In addition, the 6-1 switch switches and SPDT switches are expensive, so that the switching circuit is costly.

One aspect of an object of the present invention is to provide an RF circuit switching circuit which is comparatively small, excellent in transmission characteristics and easy in maintenance and repair.

SUMMARY OF THE INVENTION

An RF circuit switching circuit of an embodiment of the present invention includes N input wirings connected to N input RF circuits (where, N is 4, 8, 16, . . . ), N output wirings connected to N output RF circuits, N/2 first RF transfer switches each of which is connected to any two of the N input wirings different from each other, N/2 second RF transfer switches each of which is connected to any two of the N output wirings different from each other, and N internal connection routes connecting between the first and second RF transfer switches, each of the routes comprising an internal wiring or a combination of a plurality of third RF transfer switches and a plurality of internal wirings. Each of the N input RF circuits can be connected to each of the N output RF circuits through a route comprising one input wiring, one first RF transfer switch, one second RF transfer switch, one output wiring, and one internal connection route connecting between the one first RF transfer switch and the one second RF transfer switch. Each of the N input RF circuits is connected to each of the N output RF circuits by switching the first and second RF transfer switches or switching the first, second and third RF transfer switches.

The RF circuit switching circuit in one embodiment of the present invention further includes a control circuit switching the first and second RF transfer switches or the first, second and third RF transfer switches.

The RF circuit switching circuit in one embodiment of the present invention has the control circuit which stores inhibition conditions, and, when routes to be set between the input RF circuit and the output RF circuit fall into the inhibition conditions, the control circuit does not set the routes.

The RF circuit switching circuit in one embodiment of the present invention has four internal connection routes. And, each of the four internal connection routes comprises one internal wiring. And, each of the four input RF circuits is connected to each of the four output RF circuits by switching the one first RF transfer switch and the one second RF transfer switch are.

The RF circuit switching circuit in one embodiment of the present invention has eight internal connection routes. And, each of the eight internal connection routes comprises two third RF transfer switches and a plurality of internal wirings. And, each of the eight input RF circuits is connected to each of the eight output RF circuits by switching the one first RF transfer switch, the one second RF transfer switch and the two third RF transfer switch.

According to the RF circuit switching circuit of an embodiment of the present invention, each of the N input RF circuits is connected to each of the N output RF circuits through a route comprising the first and second RF transfer switch and the internal connection route by changing over the RF transfer switches on the route. This enables decreasing internal wirings in number, so that it is possible to avoid increasing of the switching circuit and its housing in size, even when a big waveguide or coaxial cable is used as the internal wirings. As a result, the housing becomes small, so that the switching circuit can be arranged without any problem even when a large number of measuring instruments are used in a radio characteristic test. Further, since the internal wirings are small in number, it becomes easy to perform the maintenance of the switching circuit and repair at the time of failure of the switching circuit. Furthermore, the connections of switches and the internal wirings can be decreased in number, so that transmission characteristics is improved in the radio characteristic test.

According to one embodiment of the present invention, a control circuit for changing over the RF transfer switch is provided. This makes it possible to switch the RF transfer switch on routes more correctly than when changing it manually, and to decrease a load for measurement.

According to one embodiment of the present invention, when routes to be set between the input RF circuit and the output RF circuit fall into the inhibition conditions, the routes are not set. This makes it possible to prevent the RF transfer switch from breaking down due to the test, and to form the RF transfer switch simply.

According to one embodiment of the present invention, each of the four input RF circuits is connected to each of the four output RF circuits changing over the first and second RF transfer switches. This makes it possible to easily design, produce, set up and maintain the switching circuit for testing the circuit (4×4 circuit) comprising the four input RF circuits and the four output RF circuits, which is most frequently used.

According to one embodiment of the present invention, each of the eight input RF circuits is connected to each of the eight output RF circuits by changing over the first and second RF transfer switches and two third RF transfer switches are. This makes it possible to easily design and so on the switching circuit for testing the circuit (8×8 circuit) comprising the eight input RF circuits and the eight output RF circuits, which is most frequently used next to the 4×4 circuit. As a result, almost all switching circuits required for actual measurement in business can be easily provided, in addition to the 4×4 circuit.

DETAILED DESCRIPTION OF THE PREFERRED EMBODIMENTS

Figure 1:
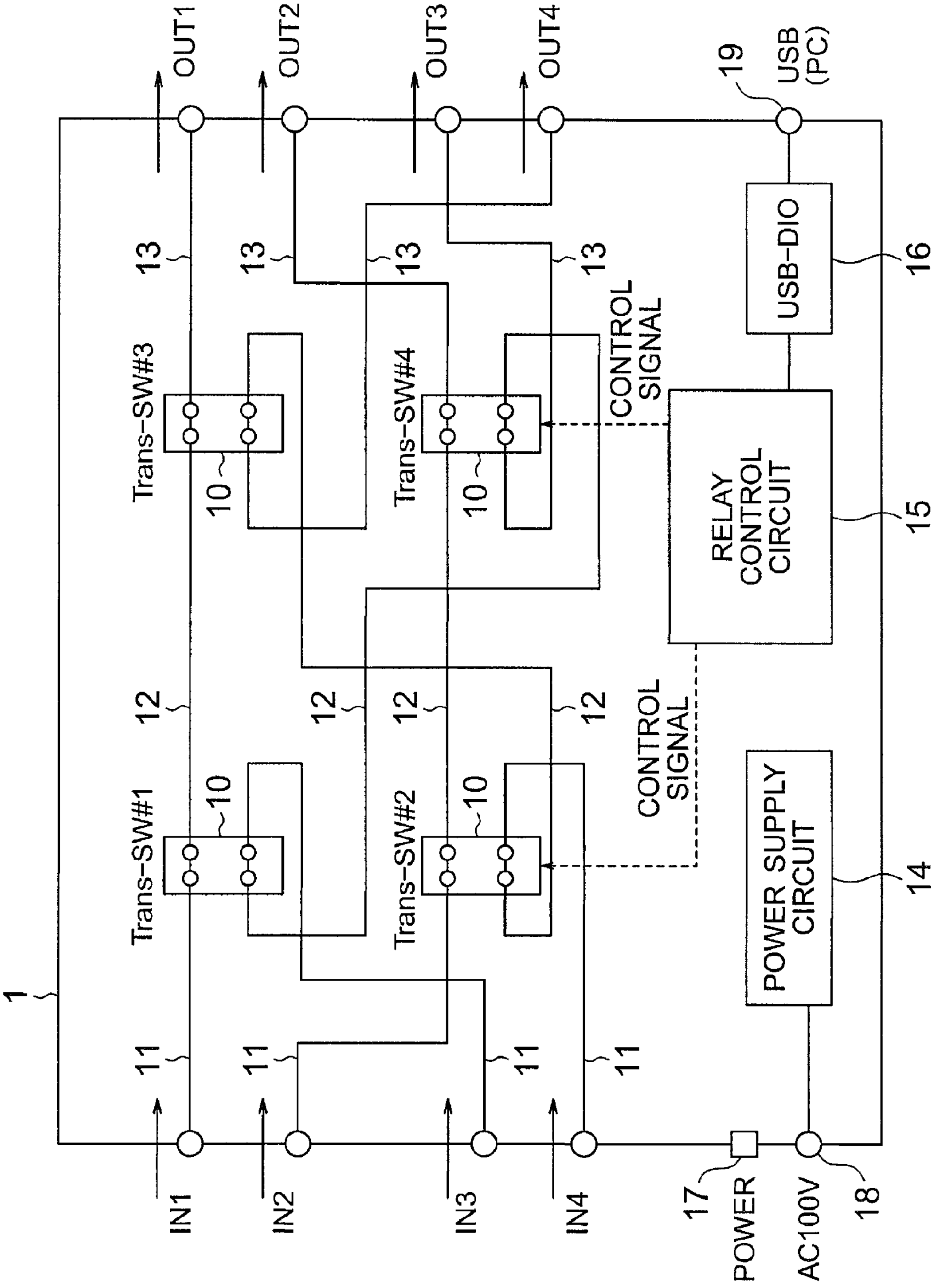
FIG. 1 is a block diagram showing one example of the RF circuit switching circuit of the present invention.

FIG. 1 is a block diagram showing one example of the RF circuit switching circuit of the present invention, and shows a switching circuit which is used for testing a circuit (4×4 circuit) comprising four input RF circuits and four output RF circuits.

An RF circuit switching circuit (hereinafter, referred to as "switching circuit") 1 includes four RF transfer switches (Trans-SW #1 to Trans-SW #4) 10, four input wirings 11, four internal wirings 12, and four output wirings 13. These wirings are provided on single substrate, for example. The number N of the input wirings 11 is equal to that of the output wirings 13. In this example, N is four. The internal wiring 12 is a wiring inside the switching circuit 1.

The four input wirings 11 are connected to four input terminals IN1 to IN4 of the switching circuit 1, respectively, and then connected to four input RF circuits (not shown) through them. The four internal wirings 12 connect between the four RF transfer switches (hereinafter, referred to as simply "transfer switch") 10. The four output wirings 13 are connected to four output terminals OUT1 to OUT4 of the switching circuit 1, respectively, and then connected to four output RF circuits (not shown) through them.

The switching circuit 1 includes a power supply circuit 14, a relay control circuit 15, a USB data input output circuit (USB-DIO) 16, a power supply switch 17, a connecting portion 18 to a commercial power supply, and a USB connection terminal 19.

When the power supply switch 17 is turned on, a commercial power supply (100 V) is supplied from the outside of the switching circuit 1 to the power supply circuit 14 through the connecting portion 18 to the commercial power supply. When the power supply switch 17 is turned off, the commercial power supply is shut off. The power supply circuit 14 generates an internal power supply (for example, 5 V), which is used as a power supply for the switching circuit 1, from the supplied commercial power supply. The internal power supply is supplied to the relay control circuit 15, the USB data input output circuit 16, and the four transfer switches 10, as their respective power supplies.

The USB connection terminal 19 is a terminal for connecting USB, and connected to a computer (not shown), for example. The computer transmits relay controlling data to the USB data input output circuit 16 through the USB connection terminal 19. The USB data input output circuit 16 inputs the received relay controlling data to the relay control circuit 15.

The relay control circuit 15 comprises a computer, for example, generates a control signal based on the provided relay controlling data, and supplies the control signal to the four transfer switches 10. The relay controlling data is inputted from the external computer (not shown), or directly inputted to the relay control circuit 15. For example, in a normal state, the control signal is a low level, and then the transfer switches 10 are in states where their relays are inoperative. At the time of operation, the control signal is a high level, and then the transfer switches 10 are in states where their relays are operative.

For convenience of illustration in FIG. 1, the control signals from the relay control circuit 15 to the transfer switches 10 are shown only to Trans-SW #2 and Trans-SW #4, and those to Trans-SW #1 and Trans-SW #3 are omitted.

Figure 2B:
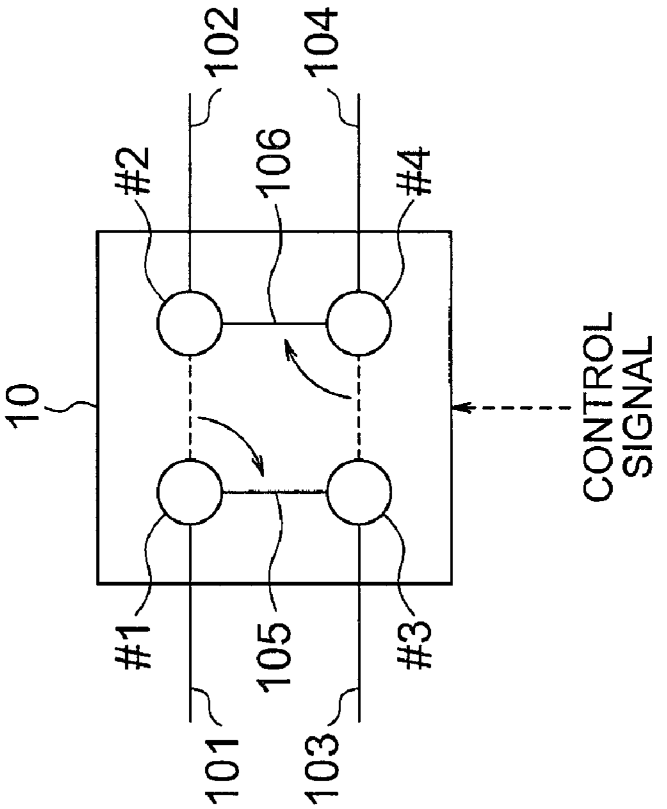
FIGS. 2A and 2B and 3 are schematic diagrams of the RF circuit switching circuit of the present invention.
Figure 2A:
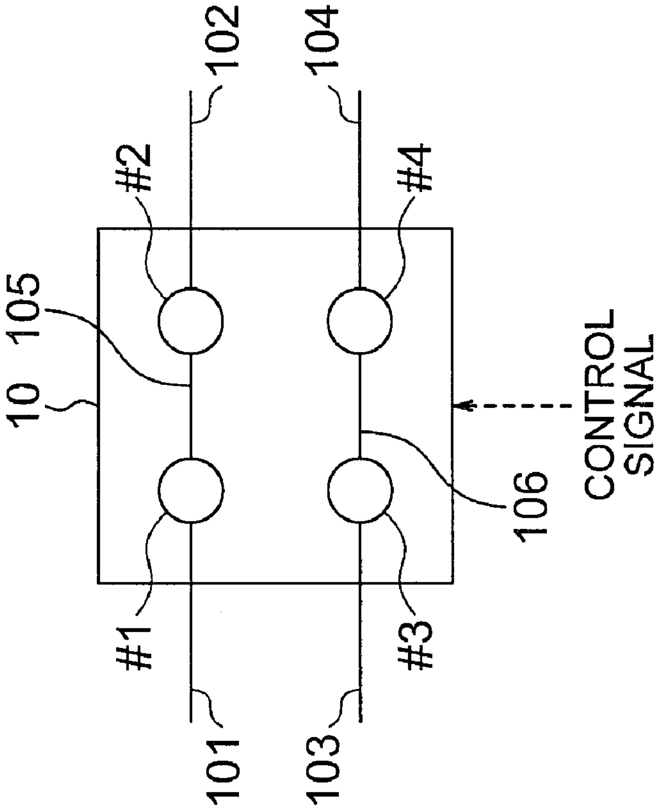

FIGS. 2A and 2B show the operation of relays in the transfer switch 10. The transfer switch 10 has four connection terminals #1 to #4, and electric mechanical relays 105 and 106. The relays 105 and 106 are able to mechanically switch between the four connection terminals #1 to #4, and are switched in response to the electrical control signal.

In a normal state (or the relays are inoperative), the control signal is turned off (or 0). Due to this turn off, as shown in FIG. 2A, the relay 105 provided in the connection terminal #1 is connected to the connection terminal #2, not to the connection terminal #3, for example. And, the relay 106 provided in the connection terminal #4 is connected to the connection terminal #3, not to the connection terminal #2. As a result, electrical connection is established between the connection terminals #1 and #2 and between the connection terminals #3 and #4. Due to this connection, a wiring 101 connected to the connection terminal #1 is connected to a wiring 102 connected to the connection terminal #2, and a wiring 103 connected to the connection terminal #3 is connected to a wiring 104 connected to the connection terminal #4.

In a state in which the relays are operative, the control signal is turned on (or 1). Due to this turned on, the relay 105 provided in the connection terminal #1 is switched from the state in which the relay 105 is connected to the connection terminal #2 to the state in which the relay 105 is connected to the connection terminal #3. And, the relay 106 provided in the connection terminal #4 is switched from the state in which the relay 106 is connected to the connection terminal #3 to the state in which the relay 106 is connected to the connection terminal #2. As a result, electrical connection is established between the connection terminals #1, and #3 and between the connection terminals #2 and #4. Due to this connection, the wiring 101 is connected to the wiring 103, and the wiring 102 is connected to the wiring 104.

For convenience of illustration, FIG. 1 (also FIGS. 3 and 5) shows the transfer switch 10 in which the relays are inoperative (or the state in FIG. 2A), as described above. However, the transfer switch 10 turns into the state in which the relays are operative, according to the control signal (or the state in FIG. 2B).

In FIG. 1, the four input wirings 11 connect between the four input terminals IN1 to IN4 and any two of the transfer switches 10. The two transfer switches 10 connected to the input terminals IN1 to IN4 are referred to as a "first transfer switch." In other words, the Trans-SW #1 and the Trans-SW #2 are the first transfer switch 10. The first transfer switch 10 is a transfer switch for input.

The input terminals IN1 and In3 are connected to the Trans-SW #1, which is the first transfer switch 10' by the input wirings 11. The input terminals IN2 and IN4 are connected to the Trans-SW #2, which is the first transfer switch 10, by the input wirings 11. The two (=N/2) first transfer switches 10 are connected to the two input wirings 11 which are different from each other, respectively.

The input wiring 11 is made of a waveguide or a coaxial cable, for example. In FIG. 1, for convenience of illustration, the input wirings 11 are bent, but the input wirings 11 are actually substantially linear. This is also applied to the internal wirings 12, external wirings 12' described later, the output wirings 13, input RF circuits 3 described later, and output RF circuits 4 described later.

The four output wirings 13 connect between the four output terminals OUT1 to OUT4 and any two transfer switches 10. The two transfer switches 10 connected to the output terminals OUT1 to OUT4 are referred to as a "second transfer switch." In other words, the Trans-SW #3 and the Trans-SW #4 are the second transfer switch. The second transfer switch 10 is different from the first transfer switch and is a transfer switch 10 for output.

The output terminals OUT1 and OUT4 are connected to the Trans-SW #3, which is the second transfer switch 10, by the output wirings 13. The output terminals OUT2 and OUT3 are connected to the Trans-SW #4, which is the second transfer switch 10, by the output wirings 13. The two (=N/2) second transfer switches 10 are connected to the two output wirings 13 which are different from each other, respectively.

The four internal wirings 12 connect between the first and the second transfer switches 10. In other words, each of the two first transfer switches 10 is connected to the two internal wirings 12, respectively. Each of the two second transfer switches 10 are connected to the two internal wirings 12, respectively. For this reason, the two first transfer switches 10 are connected to the same two second transfer switches 10. Thereby, when states of the first and second transfer switches 10 are switching, the four input wirings 11 or the input terminals IN1 to IN4 are connected to the four output wirings 13 or the output terminals OUT1 to OUT4 according to the switching, as described later.

A route connecting between the first and second transfer switches 10 is referred to as an "internal connection route." In this example, each internal connection route comprises one internal wiring 12, and does not include the transfer switch 10. The number of the internal connection routes is made equal to the number N of the input wirings 11 and the number N of the output wirings 13. Therefore, in this example, the number of the internal connection routes is four.

Figure 3:
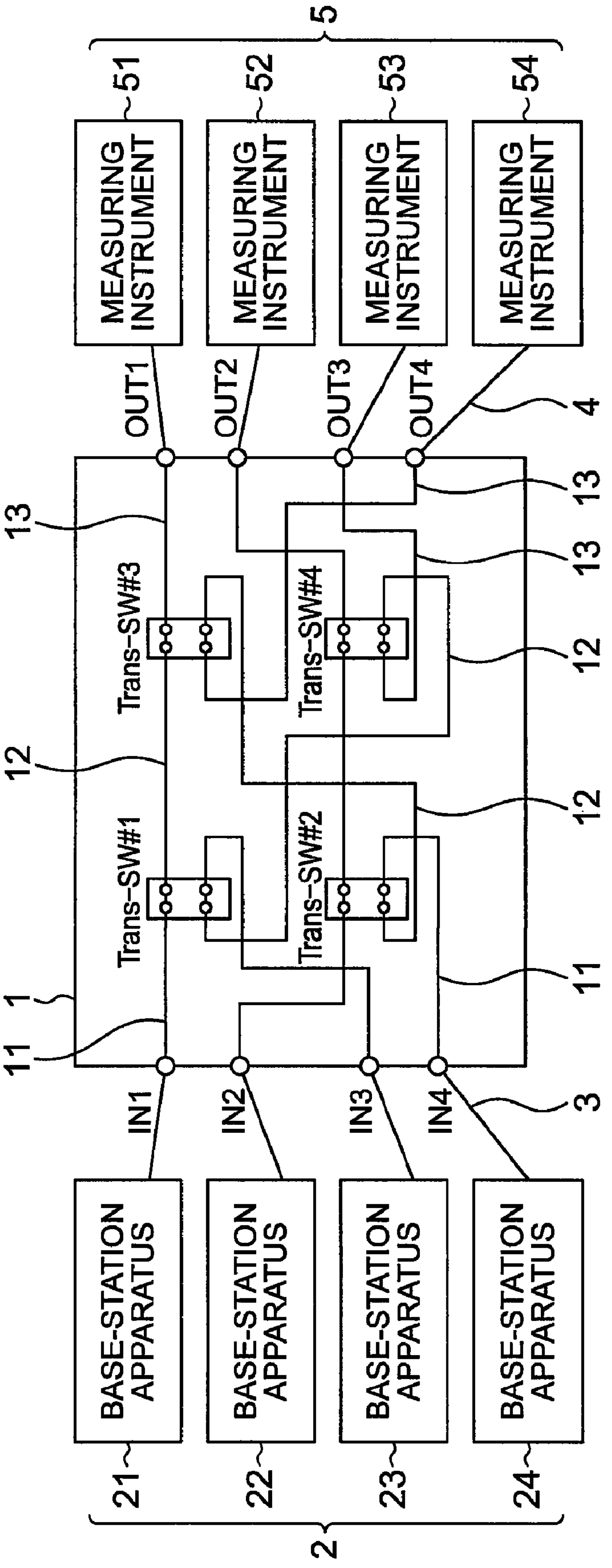

FIG. 3 is an RF circuit switching circuit of one embodiment of the present invention. In FIG. 3, the power supply circuit 14, the relay control circuit 15, the USB data input output circuit 16 and the like are omitted.

The four input wirings 11 are connected to the four input RF circuits 3 through the four input terminals IN1 to IN4. The four input RF circuits 3 are connected to base-station apparatuses 21 to 24 which are apparatuses 2 under test (or to be test). The base-station apparatuses 21 to 24 comprise various data communication apparatuses for communicating by radio frequency (RF), for example.

The four output wirings 13 are connected to the four output RF circuits 4 through the four output terminals OUT1 to OUT4. The four output RF circuits 4 are connected to measuring instruments 51 to 54, which are test equipment 5. The measuring instrument 51 comprises a spectrum analyzer or a power meter, for example. The measuring instrument 52 comprises a transmitter tester or a frequency counter, for example. The measuring instrument 53 comprises a signal generator, for example. The measuring instrument 54 comprises a network analyzer, for example. The output RF circuits 4 to which the measuring instruments 51 to 54 are connected may be replaced with each other.

Thus, the apparatuses 2 under test are connected to the test equipments 5 as described below according to the switching of the transfer switches 10.

Suppose, for example, that the Trans-SW #1 to the Trans-SW #4 are in a state shown in FIGS. 1 and 3, i.e., in a state that the relays are inoperative. This is referred to as a "first connection state."

In this case, the base-station apparatus 21 is connected to the measuring instrument 51 through the input terminal IN1, the input wiring 11, the Trans-SW #1, the internal wiring 12, the Trans-SW #3, the output wiring 13, and the output terminal OUT1. Similarly, the base-station apparatus 22 is connected to the measuring instrument 52 through the Trans-SW #2, the Trans-SW #4 and others. The base-station apparatus 23 is connected to the measuring instrument 53 through the Trans-SW #1, the Trans-SW #4 and others. The base-station apparatus 24 is connected to the measuring instrument 54 through the Trans-SW #2, the Trans-SW #3 and others.

When the measuring instrument 51 is a spectrum analyzer, for example, a time t1 required by the spectrum analyzer for measuring a spectrum of the base-station apparatus 21 can be empirically known in advance. Similarly, times t2, t3 and t4 required for finishing measuring the apparatuses 2 under test which are connected to the measuring instruments 52, 53 and 54 can also be empirically known in advance according to the combination between the measuring instruments 5 and the apparatuses 2 under test. In this example, the relays in the Trans-SW #1 to the Trans-SW #4 are made inoperative only during the time which is the longest among the times t1 to t4. For example, when the longest time is t4, the time t4 is determined as the time T1 which is a time to be taken as the first connection state (T1=t4). As a result, in the first connection state, the base-station apparatus 21, 22, 23 and 24 can be measured by the measuring instruments 51, 52, 53 and 54, respectively.

Next, for example, the Trans-SW #3 and the Trans-SW #4 are made in a state that the relays are operative. In addition, the Trans-SW #1 and the Trans-SW #2 are made in a state that the relays remain inoperative. The above state is referred to as a "second connection state." The time T2 which is a time to be taken as the second connection state can also be empirically known in advance according to the combination between the measuring instruments 5 and the apparatuses 2 under test, as is the case with the time T1 of the first connection state. This is also applied to the times T3 and T4 which are times to be taken as the third and the fourth connection state, respectively.

In this case, the base-station apparatus 21 is connected to the measuring instrument 54, according to the switching of the Trans-SW #3, through the Trans-SW #3, the output wiring 13, and the output terminal OUT4. Similarly, the base-station apparatus 22 is connected to the measuring instrument 53 according to the switching of the Trans-SW #4. The base-station apparatus 23 is connected to the measuring instrument 52 according to the switching of the Trans-SW #4. The base-station apparatus 24 is connected to the measuring instrument 51 according to the switching of the Trans-SW #3. As a result, in the second connection state, the base-station apparatus 21, 22, 23 and 24 can be measured by the measuring instruments 54, 53, 52 and 51, respectively.

Next, for example, the Trans-SW #1 and the Trans-SW #2 are made in a state that the relays are operative. The Trans-SW #3 and the Trans-SW #4 are made in a state that the relays are inoperative. The above state is referred to as a "third connection state."

In this case, the base-station apparatus 21 is connected to the measuring instrument 53, according the switching of the Trans-SW #1 and the Trans-SW #4, through the Trans-SW #1, the internal wiring 12, the Trans-SW #4, the output wiring 13, and the output terminal OUT3. The output wiring 13 is connected to the measuring instrument 53 through the output terminal OUT4. Similarly, the base-station apparatus 22 is connected to the measuring instrument 54 according to the switching of the Trans-SW #2 and the Trans-SW #3 are switched. The base-station apparatus 23 is connected to the measuring instrument 51 according to the switching of the Trans-SW #1 and the Trans-SW #3. The base-station apparatus 24 is connected to the measuring instrument 52 according to the switching of the Trans-SW #2 and the Trans-SW #4. As a result, in the third connection state, the base-station apparatus 21, 22, 23 and 24 can be measured by the measuring instruments 53, 54, 51 and 52, respectively.

Next, for example, the Trans-SW #3 and the Trans-SW #4 are made in a state that the relays are operative. The Trans-SW #1 and the Trans-SW #2 are made in a state that the relays remain operative. The above state is referred to as a "fourth connection state."

In this case, the base-station apparatus 21 is connected to the measuring instrument 52 through the Trans-SW #4, the output wiring 13, and the output terminal OUT2 according to the switching of the Trans-SW #4. Similarly, the base-station apparatus 22 is connected to the measuring instrument 51 according to the switching of the Trans-SW #3. The base-station apparatus 23 is connected to the measuring instrument 54 according to the switching of the Trans-SW #3. The base-station apparatus 24 is connected to the measuring instrument 53 according to the switching of the Trans-SW #4. As a result, in the fourth connection state, the base-station apparatus 21, 22, 23 and 24 can be measured by the measuring instruments 52, 51, 54 and 53, respectively.

Thus described above, each of the four input RF circuits 3 are connected to each of the four output RF circuits 4 by switching one first transfer switch 10 and one second transfer switch 10. As a result, the base-station apparatus 21 to 24 are sequentially connected to the measuring instruments 51 to 54 at predetermined time intervals of T1 to T4.

The signals transferred between the input RF circuit 3 and the output RF circuit 4 are made so as not to collide with each other. As described earlier, the times T1 to T4 in the first to the fourth connection state can be known in advance according to the combination between the measuring instruments 5 and the apparatuses 2 under test. Then, the relay control circuit 15 controls the Trans-SW #1 to the Trans-SW #4 according to inputs from a computer for each of the times T1 to T4 in the first to the fourth connection state. Thereby, the base-station apparatus 21 to 24 connected to the input RF circuits 3 can be effectively measured by the measuring instruments 51 to 54 connected to the output RF circuits 4, while sequentially switching circuits with respect to the base-station apparatus 21 to 24.

Figure 4A:
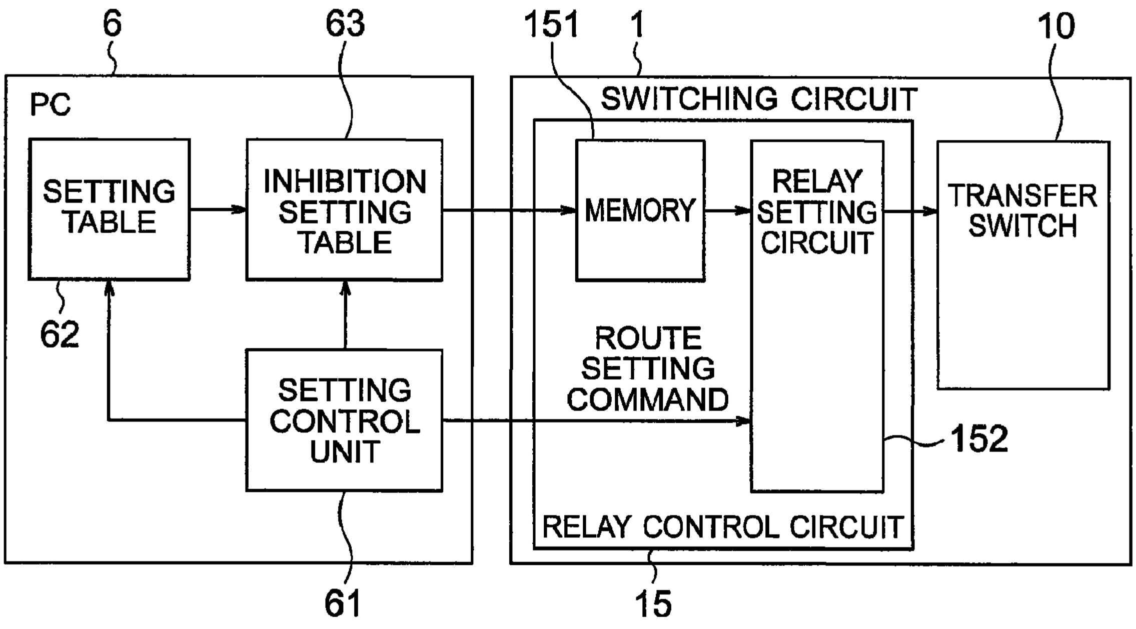
FIGS. 4A, 4B and 4C are block diagrams showing another example of the RF circuit switching circuit of the present invention.
Figure 4B:
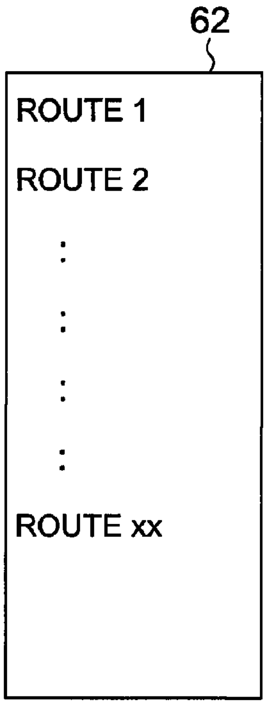
Figure 4C:
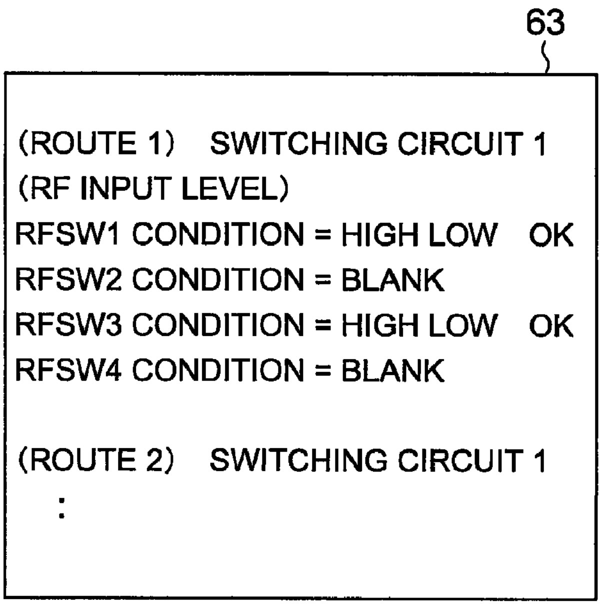

FIGS. 4A, 4B and 4C are schematic structure diagrams showing another example of the RF circuit switching circuit of the present invention and show an example in which the relay control circuit 15 of the switching circuit 1 in FIG. 1 controls the switching of the transfer switch 10 in consideration of consumption power. FIG. 4A mainly shows the relay control circuit 15 to simply the switching circuit 1.

For example, higher frequencies with a higher output are used in measurements (tests) conducted by a spectrum analyzer or a power meter as the measuring instrument 51 and a transmitter tester or a frequency counter as the measuring instrument 52. Higher frequencies with a lower output are used in measurements (tests) conducted by a signal generator as the measuring instrument 53 and a network analyzer as the measuring instrument 54. For this reason, two higher frequencies with a higher output may be simultaneously applied to single transfer switch 10. In such a case, the transfer switch 10 may break down. The complete elimination of the possibility of the breakdown makes the cost of the transfer switch 10 extremely expensive.

Then, as shown in FIG. 4A, there are provided a computer 6 having a setting control unit 61, a setting table 62, and an inhibition setting table 63. The setting control unit 61 writes the contents of the inhibition setting table 63 into a memory 151 of a relay control circuit 15, and controls a relay setting circuit 152 of the relay control circuit 15.

As shown in FIG. 4B, the setting table 62 stores each route information for all of a plurality of routes (route 1 to route xx), which can be formed by the switching circuit 1. The setting table 62 is prepared in advance according to the structure of the switching circuit 1, for example.

For example, in the switching circuit 1 in FIG. 1, the table 62 stores sixteen routes connecting between the four input terminals IN1 to IN4 and the four output terminals OUT1 to OUT4. When a "route 1" extends from the input terminal IN1 to the output terminal OUT1, for example, a route information on "route 1" is made from the input terminal IN1, the Trans-SW #1, the Trans-SW #3, and the output terminal OUT1.

As shown in FIG. 4C, the inhibition setting table 63 stores inhibition conditions for each of a plurality of routes stored in the setting table 62. The inhibition setting table 63 is prepared in advance with reference to the setting table 62 according to the structure of the switching circuit 1, for example.

For example, in the switching circuit 1 in FIG. 1, the inhibition setting table 63 stores inhabitation conditions, for each of the sixteen routes, in which high frequencies with a high output are inhibited from simultaneously passing through single transfer switch 10. For the "route 1," the Trans-SW #1 and the Trans-SW #3 are used, but the Trans-SW #2 and the Trans-SW #4 are not used. Then, the inhabitation condition of "High Low OK" is set both to the Trans-SW #1 (written as RFSW1) and the Trans-SW #3 (written as RFSW3). The inhabitation condition of "High Low OK" designates that a combination of high output and low output in the input level of radio frequency (RF) is allowed. In other word, the condition designates that a combination of the high output and high output is not allowed. For the Trans-SW #2 (written as RFSW2) and the Trans-SW #4 (written as RFSW4), the inhabitation conditions are not set, and kept "blank" in the table 63.

The inhabitation conditions may be set based on the other conditions, irrespective of the input level of radio frequency.

Prior to the start of measurement (or test), as shown in FIG. 4B, the computer 6 is connected to the relay control circuit 15 of the switching circuit 1 through the USB connection terminal 19 and the USB data input output circuit 16 (omitted from FIG. 4A). The setting control unit 61 of the computer 6 writes the inhibition setting table 63 into the memory 151 of the relay control circuit 15.

Then, the setting control unit 61 starts transmitting route setting commands to the relay setting circuit 152 of the relay control circuit 15 so that the measurement (or test) is started. The setting control unit 61 transmits the route setting commands for setting the four routes to set the aforementioned first connection state, for example. Further, the setting control unit 61 similarly transmits the route setting commands each of which is for setting the four routes to set the second, third and fourth connection states. On receipt of the route setting commands, the relay setting circuit 152 controls the switching of the transfer switches 10 based on the inhibition setting table 63 in the memory 151.

For example, in the above first connection state, the base-station apparatus 21 to 24 are connected to the measuring instruments 51 to 54 through the routes 1 to 4. At this point, supposing that both measuring instruments 51 and 53 are high in output, high frequencies with a high output simultaneously pass through the Trans-SW #1. However, the inhabitation condition of "High Low OK" is set with respect to the Trans-SW #1. That is, high frequencies with a high output from the measuring instruments 51 and 53 are inhibited from simultaneously passing through the Trans-SW #1.

The relay setting circuit 152 receives the route setting commands to direct setting of the routes 1 to 4 of the first connection state, and then reads the inhibition conditions with reference to the routes 1 to 4 in the inhibition setting table 63 in the memory 151. At this point, the two routes cannot be set simultaneously, because of the inhabitation conditions "High Low OK" of the Trans-SW #1. For this reason, the relay setting circuit 152 notifies the setting control unit 61 that measurement is not enabled.

When the setting control unit 61 receives the above notification, the setting control unit 61 transmits firstly the route setting commands to direct setting of three routes to perform the measurement by the measuring instruments 51, 52 and 54, for example. In response to the above commands, the relay setting circuit 152 simultaneously sets the three routes with reference to the inhibition setting table 63 of the memory 151, because the routes do not fall into the inhibition conditions. Then, the measuring instruments 51, 52 and 54 perform the measurement. After the measurement is finished, the relay setting circuit 152 notifies the setting control unit 61 of the completion of the measurement.

When receiving the notification, the setting control unit 61 transmits the route setting command to direct setting of one route to perform the measurement by the remaining measuring instrument 53. In response to the above command, the relay setting circuit 152 sets the one route with reference to the inhibition setting table 63 of the memory 151, because the route does not fall into the inhibition condition. Then, the measuring instrument 53 performs the measurement. After the measurement is finished, the relay setting circuit 152 notifies the setting control unit 61 of the completion of the measurement. Thereafter, the same control is repeated for the second to fourth connection states.

The computer 6 is connected to each of the measuring instruments 51 to 54 (not shown), and the setting control unit 61 shuts off any of the measuring instruments 51 to 54 from the output terminals OUT1 to OUT4 (or stops any of the outputs of the measuring instruments 51 to 54). Thereby, the setting control unit 61 shuts off the measuring instrument 53 from the output terminal OUT3, while the measuring instruments 51, 52 and 54 are performing the measurements. And, the setting control unit 61 shuts off the measuring instruments 51, 52 and 54 from the output terminals OUT1, OUT2 and OUT4, while the measuring instrument 53 is performing the measurement.

Figure 5:
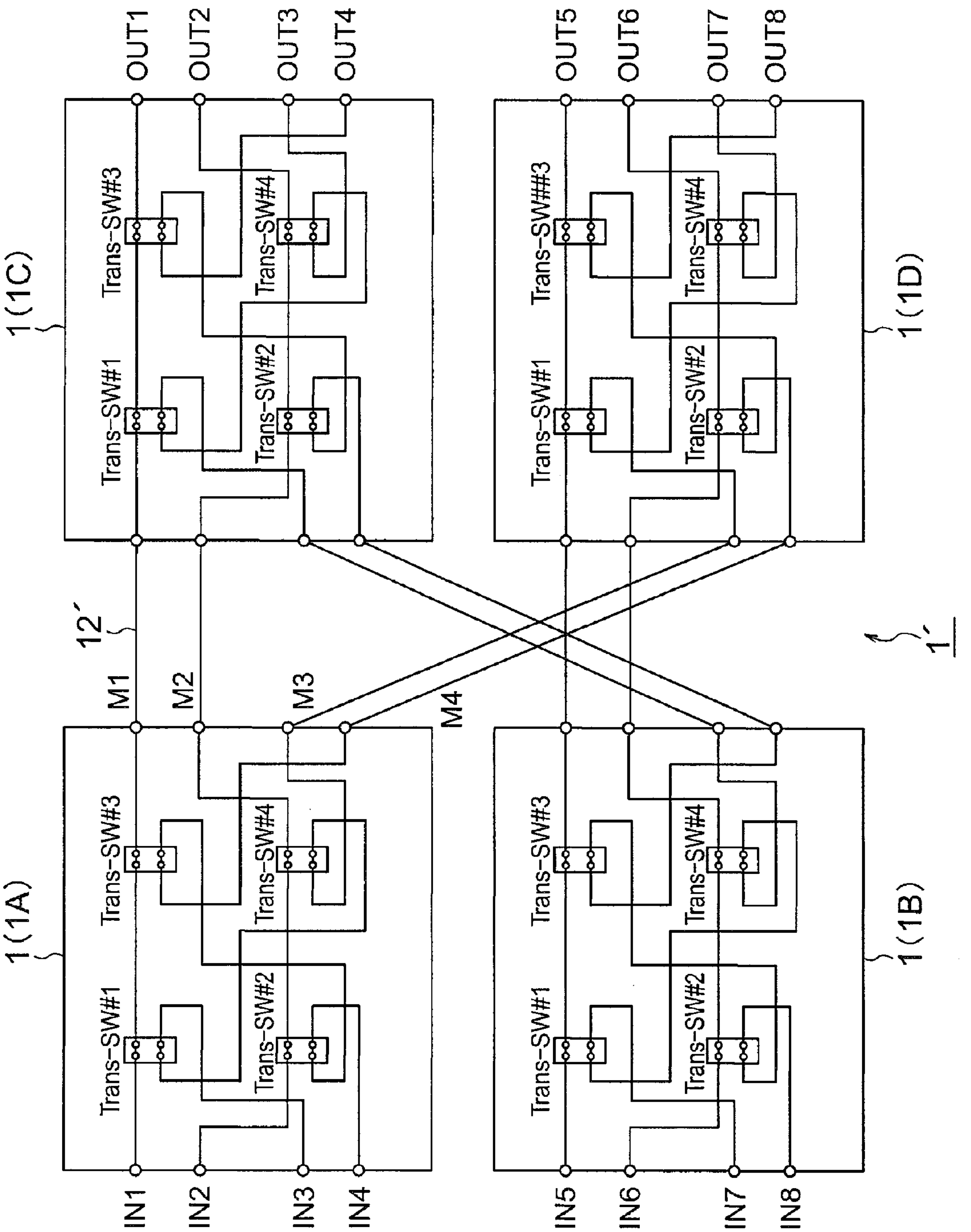
FIG. 5 is a block diagram showing still another example of the RF circuit switching circuit of the present invention.
Figure 6:
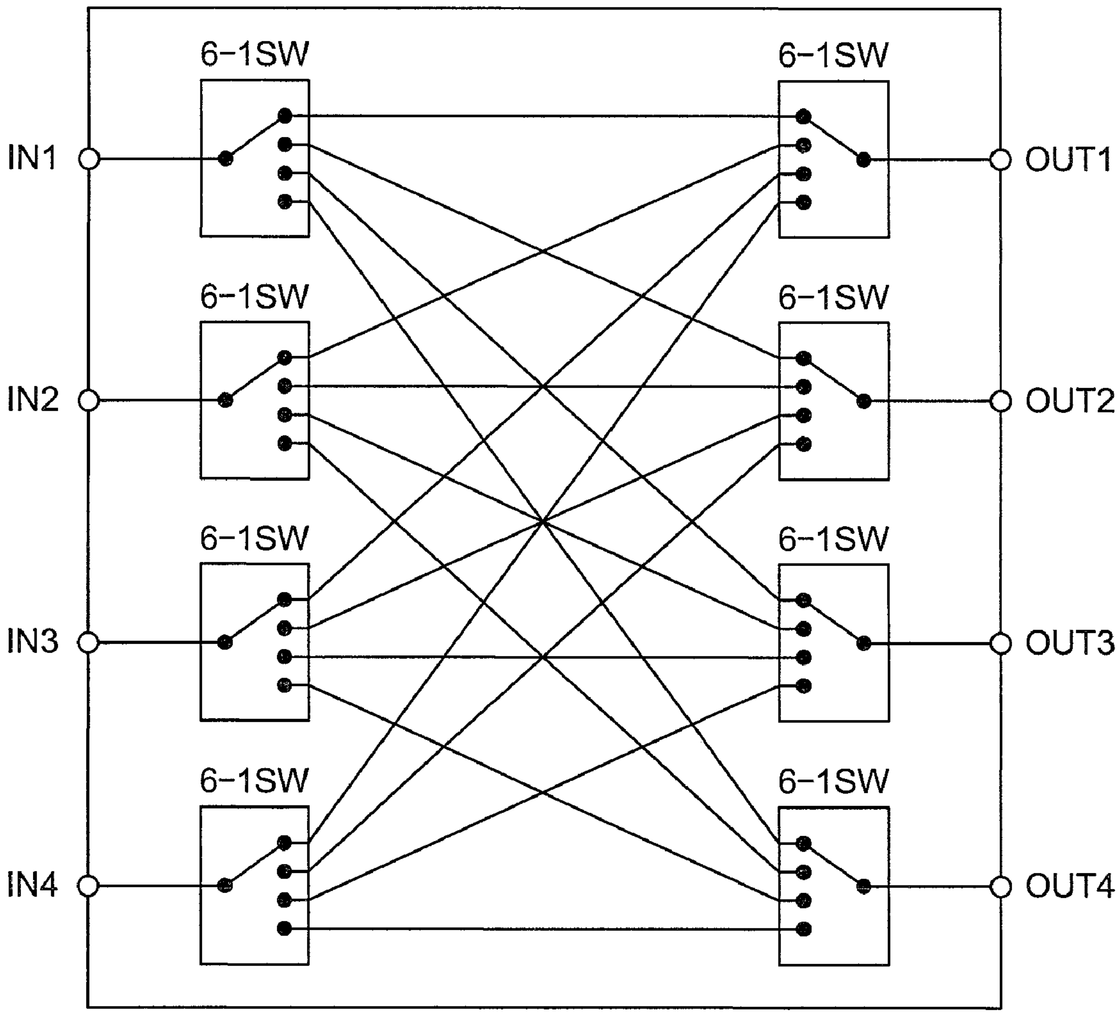
FIGS. 6 and 7 show schematic diagrams of the RF circuit switching circuit which is a background of the present invention.
Figure 7:
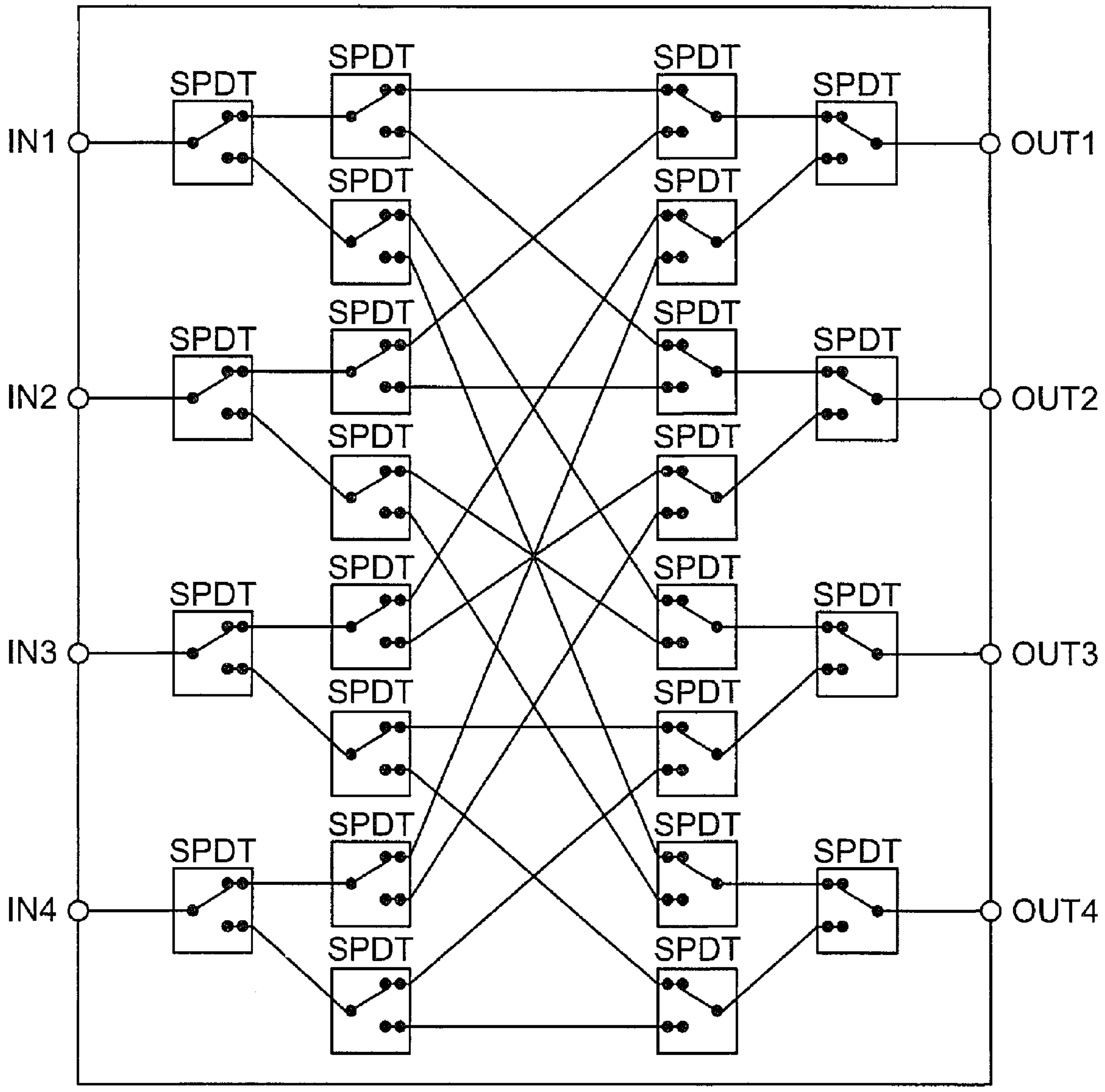

FIG. 5 is a schematic structure diagram showing still another example of the RF circuit switching circuit of the present invention, and shows a switching circuit (or switcher) 1' used for a test on a circuit (8×8 circuit) comprising eight input RF circuits and eight output RF circuits. That is, it is an example of N=8. Incidentally, in FIG. 5, the power supply circuit 1, the relay control circuit 15, and the USB data input output circuit 16 of each switching circuit 1 are omitted.

The switching circuit 1' comprises four switching circuits 1 (1A to 1D) shown in FIG. 1. Four input RF circuits (not shown) are connected to each of the switching circuits 1A and 1B. Four output RF circuits (not shown) are connected to each of the switching circuits 1C and 1D. The switching circuit 1A is connected to the switching circuits 1C and 1D by four wirings 12'. The switching circuit 1B is also connected to the switching circuits 1C and 1D by four wirings 12'.

The wiring 12' is an internal wiring of the switching circuit 1' viewed from the input RF circuit 3 and the output RF circuit 4, but, on the other hand, it is a wiring provided outside the switching circuit 1. Then, in order to distinguish between the wiring 12' and the internal wiring 12 in the switching circuit 1, the internal wiring 12 is referred to as an "external wiring."

As described above with reference to FIG. 1, in the switching circuit 1A, for example, the connections between the input terminals IN1 to IN4 and the intermediate terminals M1 to M4 (or, the output terminals OUT1 to OUT4 of the switching circuit 1A) are sequentially switched. This switching is also applied to the switching circuits 1B to 1D.

On the other hand, the switching circuit 1A is connected to the switching circuits 1C and 1D by four external wirings 12', as shown in FIG. 5. That is, one output of the Trans-SW#3 and the Trans-SW#4 is connected to the switching circuit 1C, and the other output thereof is connected to the switching circuit 1D. This is also applied to the connections between the switching circuit 1B and the switching circuits 1C and 1D. Thus, by switching states of the transfer switches 10 in the switching circuits 1A to 1D, the eight input wirings (11) or the eight input terminals IN1 to In8 can be connected to the eight output wirings (13) or the eight output terminals OUT1 to OUT8.

In this example, four (=8/2) first transfer switches 10 of the switching circuit 1' are provided, each of which comprises a plurality of the Trans-SW #1 and a plurality of the Trans-SW #2 used as inputs of the switching circuits 1A and 1B. Four (=8/2) second transfer switches 10 of the switching circuit 1' are provided, each of which comprises a plurality of the Trans-SW #3 and a plurality of the Trans-SW #4 used as outputs of the switching circuits 1C and 1D.

Each of the internal connection routes comprises two third transfer switches 10 and a plurality (or five) of internal wirings. The number of the internal connection routes is equal to N, so that it is eight. The Trans-SW #3 and the Trans-SW #4 for outputs of the switching circuits 1A and 1B and the Trans-SW #1 and the Trans-SW #2 for inputs of the switching circuits 1C and 1D are third transfer switches 10 of the switching circuit 1'.

In this example, as is the case with FIG. 1 or 4, each of eight input RF circuits 3 is connected to each of eight output RF circuits 4, by switching one first transfer switch 10, one second transfer switch 10, and two third transfer switches 10, which are in the internal connection routes.

Between the switching circuit 1A and the switching circuits 1C and 1D, the intermediate terminals M1 and M2 are doubly inputted to the switching circuit 1C, and the intermediate terminals M3 and M4 are doubly inputted to the switching circuit 1D. This is also applied to connections between the switching circuit 1B and the switching circuits 1C and 1D. Therefore, the structure of the circuits becomes redundant due to this structure. For this reason, when one input terminal IN1 is connected to eight output terminals OUT1 to OUT8 for example, originally three transfer switches 10 may exist on one route from the input terminal IN1 to each output terminal OUT (because $2^3$=8). However, four transfer switches 10 need to exist on one route. This is because one transfer switch 10 (for example, the Trans-SW#3 of the switching circuit 1A and the Trans-SW #1 of the switching circuit 1C) is duplicated between two switching circuits 1 existing on the route for the above reason.

Thus, the circuit structure is somewhat redundant. However, four switching circuits 1 having the same structure are used to form the circuit, so that it is easy to form the switching circuit 1'. This structure makes it possible to more simply designed, produced, installed and maintained the switching circuit 1', as compared with the case that the switching circuit 1' is redesigned according to the number of the input RF circuit 3 and the output RF circuit 4. In other words, when the number of the input RF circuit 3 and/or the output RF circuit 4 is five or more to eight or less, all that is needed is to design the switching circuit 1' in FIG. 5. Incidentally, the switching circuit 1 in FIG. 1 has the same redundancy.

FIG. 5 shows an 8×8 circuit. For a 16×16 circuit (N=16), originally four transfer switches 10 may exist on one route (because $2^4$=16). However, six transfer switches 10 need to exist thereon. For this reason, twelve switching circuits 1 are used to form a necessary switching circuit. In this case, two transfer switches 10 are duplicated between three switching circuits 1 existing on the one route for the above reason. In this case also, the circuit structure is somewhat redundant. However, by using twelve switching circuits 1, it is possible to easily form the switching circuit 1', and avoid complications of redesigning the switching circuit 1' according to the number of the input RF circuit 3 and the output RF circuit 4.

The number N may be 32, 64 . . . (i.e., $N=2^M$, M is a positive integer). However, the number N of 16 or more does not make sense. When increasing the size of the switching circuit 1 (1'), combination of high outputs also increase. Thus, the switching circuit 1 for 4×4 circuit in FIG. 1 or for 8×8 circuit in FIG. 5 is sufficient to meet the need.

According to the present embodiment, as described above, the internal wirings can be decreased in number in the RF circuit switching circuit, so that it is possible to avoid increasing of size of the switching circuit and its housing, and arrange the switching circuit without any problem in a radio characteristic test. Further, it is possible to easily perform the maintenance of the switching circuit, and easily repair at the time of failure in the switching circuit. Furthermore, it is possible to decrease the number of the connections of switches number as well as the number of the internal wirings, so that the transmission characteristics in the radio characteristic test are improved, and the radio characteristic of the apparatus under test is more accurately measured. A switching circuit can be realized by a comparatively low cost RF transfer switch without using an expensive 6-1 switch or SPDT switch.

What is claimed is:

1. An RF circuit switching circuit, comprising:

N input wirings connected to N input RF circuits (where, N is 4, 8, 16, . . . );

N output wirings connected to N output RF circuits;

N/2 first RF transfer switches each of which is connected to any two of the N input wirings different from each other;

N/2 second RF transfer switches each of which is connected to any two of the N output wirings different from each other; and N internal connection routes connecting between the first and second RF transfer switches, each of the routes comprising an internal wiring or a combination of a plurality of third RF transfer switches and a plurality of internal wirings, wherein each of the N input RF circuits can be connected to each of the N output RF circuits through a route comprising one input wiring, one first RF transfer switch, one second RF transfer switch, one output wiring, and one internal connection route connecting between the one first RF transfer switch and the one second RF transfer switch; and each of the N input RF circuits is connected to each of the N output RF circuits by switching the first and second RF transfer switches or switching the first, second and third RF transfer switches.

2. The RF circuit switching circuit according to claim 1, further comprising:

a control circuit switching the first and second RF transfer switches or the first, second and third RF transfer switches.

3. The RF circuit switching circuit according to claim 2, wherein the control circuit connects each of the N input RF circuits to each of the N output RF circuits by switching the first and second RF transfer switches or switching the first, second and third RF transfer switches in a predetermined time period.

4. The RF circuit switching circuit according to claim 2, wherein the control circuit stores inhibition conditions, and, when routes to be set between the input RF circuit and the output RF circuit fall into the inhibition conditions, the control circuit does not set the routes.

5. The RF circuit switching circuit according to claim 4, wherein the inhibition conditions are made of a combination of the high and low of output levels of radio frequency signals passing through the first and second RF transfer switches or through the first, second and third RF transfer switches.

6. The RF circuit switching circuit according to claim 5, wherein the control circuit is provided with a memory storing an inhibition setting table in which the inhibition conditions are set.

7. The RF circuit switching circuit according to claim 6, further comprising: connecting means for connecting a computer to the control circuit, wherein the control circuit stores the inhibition setting table inputted from the computer in the memory.

8. The RF circuit switching circuit according to claim 7, wherein the control circuit does not set routes, when the routes directed by a command fall into the inhibition conditions, based on the command directing the routes to be set between the input and output RF circuits and the inhibition setting table stored in the memory.

9. The RF circuit switching circuit according to claim 1, wherein the N is four, and each of the four internal connection routes comprises one internal wiring, and each of the four input RF circuits is connected to each of the four output RF circuits by switching the one first RF transfer switch and the one second RF transfer switch are.

10. The RF circuit switching circuit according to claim 1, wherein the N is eight, and each of the eight internal connection routes comprises two third RF transfer switches and a plurality of internal wirings, and each of the eight input RF circuits is connected to each of the eight output RF circuits by switching the one first RF transfer switch, the one second RF transfer switch and the two third RF transfer switch.

11. The RF circuit switching circuit according to claim 10, further comprising:

two first switching circuits each of which is connected to any four of the eight input RF circuits;

two second switching circuits each of which has the same structure with the first switching circuit and is connected to any four of the eight output RF circuits; and eight external wirings connecting between the first and second switching circuits, wherein each of the switching circuits further includes:

four input wirings connected to four input terminals;

four output wirings connected to four output terminals;

two input RF transfer switches each of which is connected to any two of the four input wirings different from each other;

two output RF transfer switches each of which is connected to any two of the four output wirings different from each other; and four internal wirings connecting between the input and output RF transfer switches, wherein each of the four input RF circuits is connected to each of the four output RF circuits by switching the one first RF transfer switch and the one second RF transfer switch, and wherein the input RF transfer switch of the first switching circuit is used as the first RF transfer switch, the output RF transfer switch of the second switching circuit is used as the second RF transfer switch, and the output RF transfer switch of the first switching circuit and the input RF transfer switch of the second switching circuit are used as the third RF transfer switches.

* * * * *